D. ANTHONY.
Thrashing Machine.
No. 5,229.
2 Sheets—Sheet 1.
Patented Aug. 7, 1847.
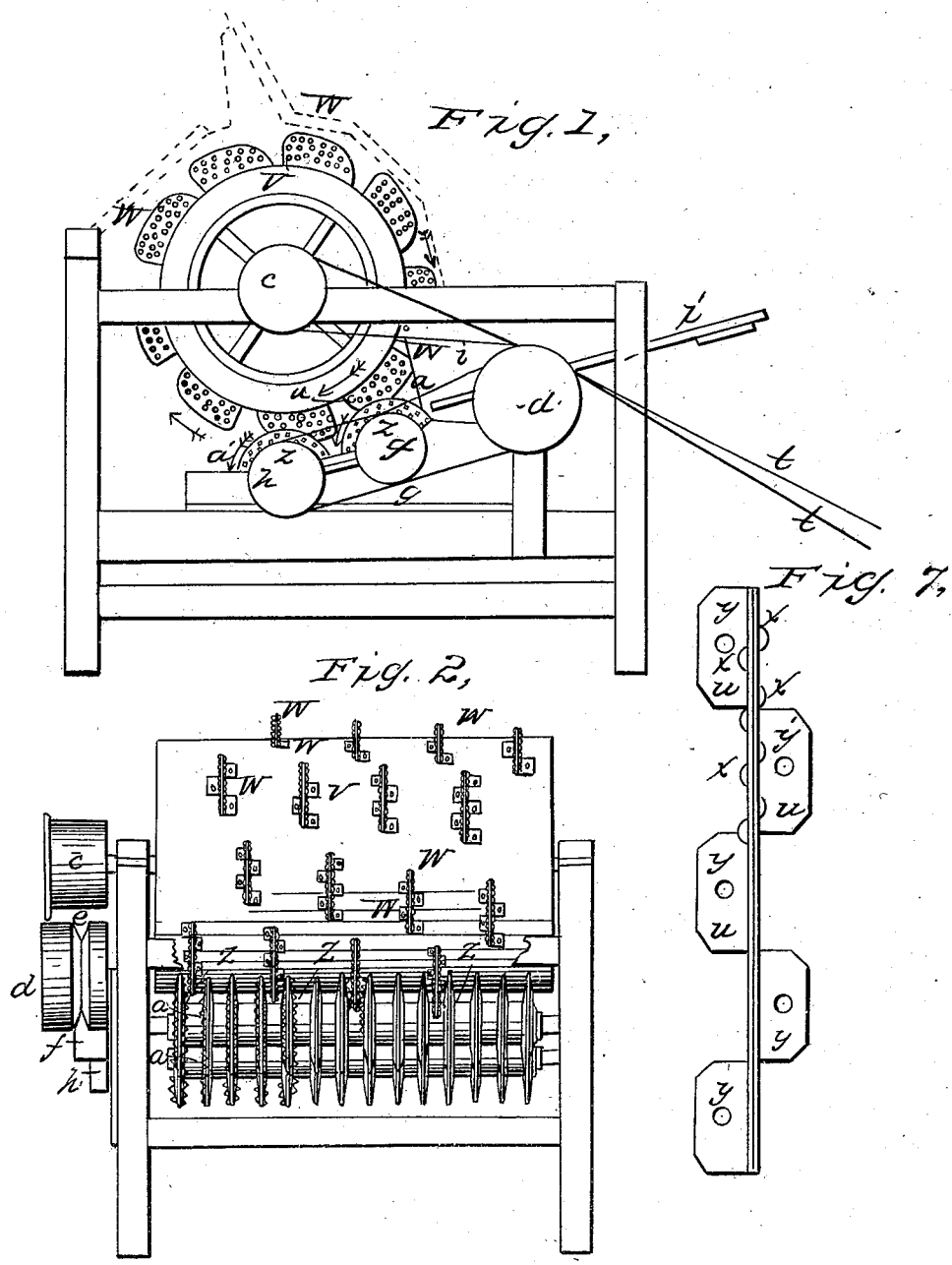

D. ANTHONY.
Thrashing Machine.
No. 5,229.
2 Sheets—Sheet 2.
Patented Aug. 7, 1847.
Fig. 3,
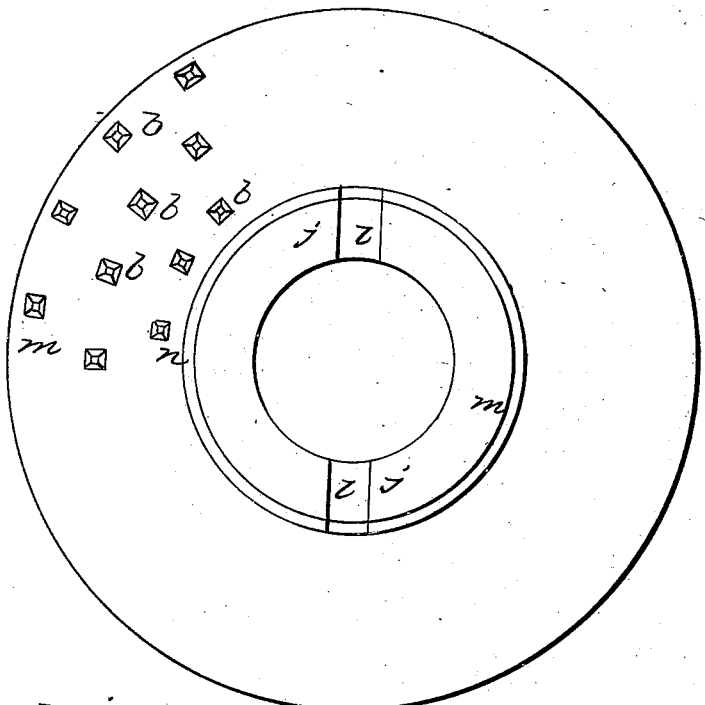
Fig. 4,
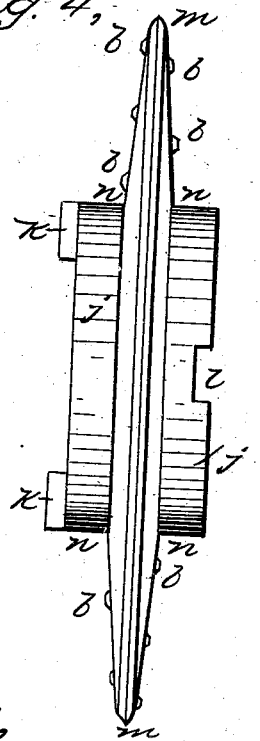
Fig. 5,
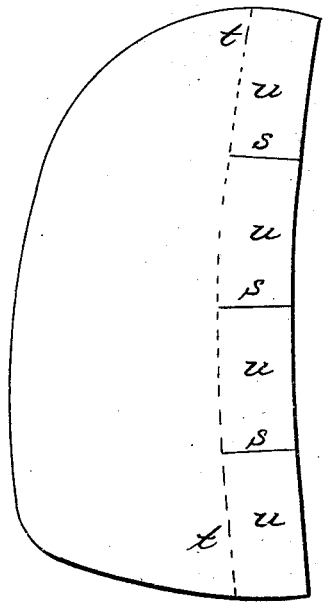
Fig. 6,
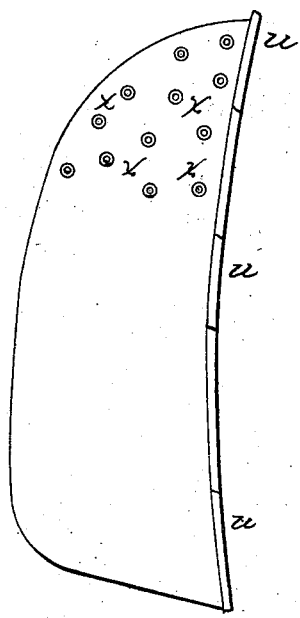

UNITED STATES PATENT OFFICE.

DAVID ANTHONY, OF SHARON, NEW YORK.

THRESHING-MACHINE.

Specification of Letters Patent No. 5,229, dated August 7, 1847.

*To all whom it may concern:*

Be it known that I, DAVID ANTHONY, of Sharon, in the county of Schoharie and State of New York, have invented a new and Improved Threshing-Machine; and I do hereby declare that the following is a full, clear, and exact description of the same, reference being had to the accompanying drawings, making part of this specification, in which—

Figure 1 is a side and Fig. 2 an end elevation of my machine. Figs. 3, 4, 5, 6, and 7 are views of detached parts.

My improvements respect the contrivances for separating the grain from the straw.

$v$ is a cylinder furnished with beaters $w$ $w$ &c., of a peculiar construction.

Figs. 6 and 7 represent respectively a side and edge view of one of them at full size. They may be conveniently formed of iron boiler-plate cut to the form shown in Fig. 6. A series of burrs $x$ $x$ $x$, &c., are raised by punching up from each side of the plate, and operate in conjunction with the revolving disks hereinafter described, to strip the grain from the head.

To prepare the flanges for securing these beaters to the cylinder, I proceed as follows. Having cut out a blank of the form shown in Fig. 5, I strike the curve line $t$ $t$ with a radius equal to that of the cylinder $v$. I then cut the radial slits $s$ $s$ $s$, &c., which extend from the outer edge of the blank to the curve line before mentioned. I then bend the sections $u$ $u$, &c., formed by the slits, alternately to the right and left, until they form right angles with the face of the beaters as shown in Fig. 7. Each section of the flange has a hole $y$ punched or drilled therein to receive a screw or nail. The edge is also somewhat sharpened in order the more readily to divide the straw. As the main cylinder revolves, these beaters pass successively through the intervals between the series of disks $z$ $z$, &c., of the two bed cylinders $a$ $a'$ which are placed immediately beneath the main cylinder $v$. One of these disks detached is shown at full size in Figs. 3 and 4, the former being a side, and the latter an edge view.

$j$ $j$ is the hub or eye through which the shaft passes.

$k$ $k$ are small projections which fall into corresponding indentations $l$, $l$ upon the adjoining disk, and serve to lock the series together.

The thickness of the working portion of the disk gradually increases from an obtuse edge at the circumference $m$ to about one third of an inch at the junction with the eye at $n$, $n$, (see Fig. 4). The surfaces of both sides are studded with small truncated pyramids $b$ $b$, &c., which act as teeth or rubbers for stripping the grain from the straw.

To save labor in drawing, as well as to prevent obscurity, a portion only of the teeth or rubbers are represented; and the same remark may be made in reference to the burrs upon the beaters in the other figures.

The disks are formed of cast iron and with their hubs teeth, &c., are cast in one piece. The edges are sharpened like those of the beaters, and for the same reason. The beaters are as before suggested, so arranged that each revolves between two adjacent disks.

The several cylinders are driven as follows: The belt from the driving power is carried to the pulley $c$, passing in its course over the loose pulley $d$ with sufficient friction thereon to cause it to revolve. A deep groove $e$ is formed in the face of this pulley to receive a cord or strap working in a similar groove in the pulley $f$, upon the shaft of the bed cylinder $a$. A counter belt $g$, drives $h$ upon the shaft of the other bed cylinder. The several cylinders revolve in the dirction indicated by the arrows.

$i$ $i$ is the feeding trough.

The bed cylinders serve to accelerate the passage of the straw through the machine, while the greater velocity of the main cylinder causes the grain to be stripped from the heads.

What I claim as my invention and desire to secure by Letters Patent is—

The mode of constructing the beaters upon the main cylinder $v$ and the combination of the latter with the bed cylinders $a$ $a'$ provided with the disks $z$ $z$ $z$, &c., hereinbefore described; the whole being constructed and operating substantially in the manner and for the purpose herein set forth and described.

DAVID ANTHONY.

Witnesses:
HENRY I. MOAK,
ANN ELIDA MOAK.